A. SCHUTT.
DENTAL INSTRUMENT.
APPLICATION FILED MAY 21, 1915.
1,168,911.
Patented Jan. 18, 1916.
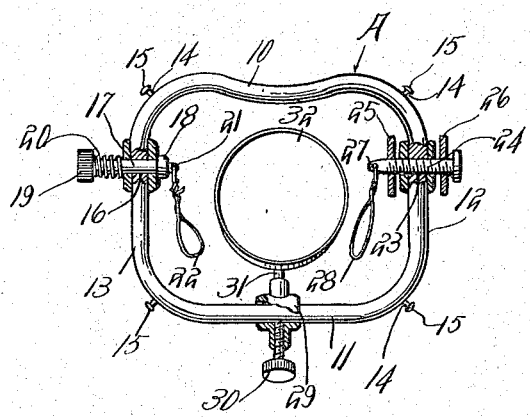

UNITED STATES PATENT OFFICE.

ALEXANDER SCHUTT, OF BISMARCK, NORTH DAKOTA.

DENTAL INSTRUMENT.

1,168,911.     Specification of Letters Patent.     Patented Jan. 18, 1916.

Application filed May 21, 1915. Serial No. 29,647.

*To all whom it may concern:*

Be it known that I, ALEXANDER SCHUTT, a citizen of the United States, residing at Bismarck, in the county of Burleigh, State of North Dakota, have invented certain new and useful Improvements in Dental Instruments; and I do hereby declare the following to be a full, clear, and exact description of the invention, such as will enable others skilled in the art to which it appertains to make and use the same.

This invention relates to dental instruments.

The object of the invention resides in the provision of a dental instrument which materially assists in performing various operations indulged in in the practice of dentistry.

To this end the invention consists in the details of construction and in the arrangement and combination of parts to be hereinafter more fully described and particularly pointed out in the appended claims.

In describing the invention in detail reference will be had to the accompanying drawings wherein like characters of reference denote corresponding parts in the several views, and in which—

Figure 1 is a front view of the instrument partly in section; Fig. 2, a side view of same; and Fig. 3, a top view.

Referring to the drawings the instrument is shown as comprising a frame A which includes a top part 10, a bottom member 11, and side parts 12 and 13. The top part 10 is curved to conform substantially with the curvature of the upper lip, while the bottom part 11 is substantially straight. The frame A has formed integral therewith a plurality of projections 14 the outer ends of which terminate in heads 15. These projections 14 are designed to have attached thereto the rubber dam which is employed frequently in dental operations. The side part 13 is provided with a transverse passage 16 in which is slidably mounted a pin or rod 17. The inner end of the rod 17 is enlarged as at 18 whereby movement of the rod 17 outwardly is limited. The outer end of the rod 17 is provided with a head 19 and encircling the rod is a spring 20 one end of which bears against the part 13 and the other end against the head 19 and normally holds the rod 17 at the limit of its outward movement. The inner end of the rod 17 is provided with an eye 21 and secured through this eye is a loop of fine wire 22. Formed in the member 12 in line with the passage 16 is a passage 23 and slidably engaged in this passage is a screw 24. Threaded on the screw 24 inwardly of the part 12 is a disk 25 while a corresponding disk 26 is threaded on said screw outwardly of the part 12. Through the medium of the disks 25 and 26 the screw 24 can be locked in any desired adjustment as will be obvious. The inner end of the screw 24 is provided with an eye 27 and secured through this eye is a fine wire loop 28. By engaging the loops 22 and 28 over adjacent teeth and then adjusting the screw 24 in the desired manner it will be apparent that the teeth can be separated. By crossing the loops 22 and 28 and engaging same over adjacent teeth the latter can be drawn together and under such conditions the wire loops will protect the gums from abrasive strip used in polishing fillings.

Slidably mounted on the part 11 is a sleeve 29 which carries a set screw 30 adapted to impinge against the part 11 to lock the sleeve in a desired adjustment thereon, it being noted in this connection that the sleeve 29 is rotatable on the part 11 as well as slidable. Threaded in the sleeve 29 at right angles to the longitudinal axis thereof is a stem 31 which has fixed on its free end a mirror 32 of the type usually employed in dental work. When the device is applied the mirror will show the inner surface of the teeth, deflect the light against the tooth while working thereon, assist in keeping the mouth open and assist in keeping the tongue away from the teeth. The frame A can be applied in such manner as to hold the lips back and render the use of a rubber dam unnecessary.

While one form of carrying the invention into practice has been illustrated and described it will be obvious that various changes in proportion and arrangement of parts can be resorted to without departing from the spirit of the invention as set forth in the appended claims.

What is claimed is:—

1. A dental instrument comprising a frame, members adjustably mounted in opposite sides of said frame, and wire loops secured on the inner ends of said members respectively.

2. A dental instrument comprising a frame, members adjustable in opposite sides of said frame, wire loops secured to the inner ends of said members respectively, and a mirror mounted on the bottom member of the frame for rotatable and slidable adjustment.

3. A dental instrument comprising a frame, a plurality of lateral projections on the frame having headed outer ends, members adjustably mounted in opposite sides of the frame, and wire loops secured on the inner end of the member respectively.

In testimony whereof, I affix my signature, in the presence of two witnesses.

ALEXANDER SCHUTT.

Witnesses:
R. PEMARDEN,
E. KITCHEL ALLENSWORTH.

Copies of this patent may be obtained for five cents each, by addressing the "Commissioner of Patents, Washington, D. C."